United States Patent

Kakizaki et al.

[11] Patent Number: 5,905,706
[45] Date of Patent: *May 18, 1999

[54] ELECTRONIC EQUIPMENT SUCH AS RECORDING AND/OR REPRODUCING FOR RECORDING MEDIUM

[75] Inventors: Masahiko Kakizaki, Tokyo; Tadami Nakamura, Saitama, both of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/722,143

[22] PCT Filed: Feb. 23, 1996

[86] PCT No.: PCT/JP96/00429

§ 371 Date: Oct. 11, 1996

§ 102(e) Date: Oct. 11, 1996

[87] PCT Pub. No.: WO96/26517

PCT Pub. Date: Aug. 29, 1996

[30] Foreign Application Priority Data

Feb. 24, 1995 [JP] Japan .................................. 7-037011

[51] Int. Cl.⁶ .................................................. G11B 33/02
[52] U.S. Cl. ............................................................ 369/75.1
[58] Field of Search ................................. 369/75.1, 75.2, 369/77.1, 77.2; 360/97.01, 97.02, 97.03, 97.04

[56] References Cited

U.S. PATENT DOCUMENTS

| | | | |
|---|---|---|---|
| 3,653,880 | 4/1972 | Gitlesen | 75/168 C |
| 3,932,892 | 1/1976 | Saito | 365/110 |
| 4,571,456 | 2/1986 | Paulsen et al. | 361/680 X |
| 4,811,314 | 3/1989 | Alves | 369/10 |
| 5,143,564 | 9/1992 | Gruzleski et al. | 148/420 |
| 5,237,486 | 8/1993 | LaPointe et al. | 361/681 |
| 5,309,421 | 5/1994 | Fujisawa | 369/77.1 |

FOREIGN PATENT DOCUMENTS

| | | |
|---|---|---|
| 57-124999 | 8/1982 | Japan . |
| 61-037943 | 2/1986 | Japan . |
| 62-096628 | 5/1987 | Japan . |
| 62-109275 | 5/1987 | Japan . |
| 63-220699 | 9/1988 | Japan . |
| 3-097839 | 4/1991 | Japan . |
| 667674 | 10/1988 | Switzerland . |
| 91/19288 | 12/1991 | WIPO . |

*Primary Examiner*—William J. Klimowicz
*Attorney, Agent, or Firm*—Jay H. Maioli

[57] ABSTRACT

An electronic equipment such as a recording and/or reproducing apparatus for a recording medium, etc. adapted so that a recording/reproduction unit, an electro-acoustic transducer such as speaker unit, etc. and/or an electronic circuit are accommodated within a casing. At least a portion of the casing constituting the electronic equipment is formed by magnesium or magnesium alloy excellent in the vibration absorption characteristic to thereby attenuate vibration produced from respective portions or respective members accommodated within the casing to eliminate influence of vibration between respective portions or respective members. Because influence of vibration mutually exerted is eliminated, in the case where this invention is applied to the recording and/or reproducing apparatus for the recording medium, satisfactory recording and/or reproduction of information signals can be realized. Thus, reproduction of sound having more satisfactory sound quality can be realized with satisfactory reproduction characteristics.

9 Claims, 4 Drawing Sheets

ELECTRONIC EQUIPMENT SUCH AS RECORDING AND/OR REPRODUCING FOR RECORDING MEDIUM

TECHNICAL FIELD

This invention relates to electronic equipment, such as, for example, a recording and/or reproducing apparatus, etc. in which a recording and/or reproduction unit for carrying out recording and/or reproduction of information signals with respect to a recording medium such as an optical disc or a magnetic tape, etc. on which information signals are recorded, and/or an electro-acoustic transducer like a speaker unit or a microphone unit are accommodated within a casing.

BACKGROUND ART

Hitherto, there have been used electronic equipment, such as, for example, a disc recording and/or reproducing apparatus or a tape recording and/or reproducing apparatus, etc. for carrying out recording and/or reproduction of information signals with respect to a recording medium such as an optical disc or a magnetic tape, etc. on which information signals are recorded.

In the electronic equipment of this kind, electronic equipment caused to be of compact structure so that they can be used exclusively in a carrying (portable) manner are widely used. In these electronic equipment used in a carrying (portable) manner, even in the case where a user inadvertently falls when he is carrying it, or any impact is applied thereto, it is strongly required to securely protect the recording and/or reproduction unit and/or other mechanical parts accommodated within the casing.

In view of the above, in order to guarantee mechanical strength of the casing within which the recording and/or reproduction unit and/or other mechanical parts are accommodated, electronic equipment in which the casing is formed by metallic material are used. As metallic material constituting the casing, aluminum (Al) alloy, titanium (Ti) alloy, and zinc (Zn) alloy, etc. are used.

The casing formed by such metallic material as mentioned above is formed by implementing press-working (pressing) to aluminum alloy or titanium alloy in a thin plate form.

Moreover, in the casing formed by zinc alloy or aluminum alloy, the casing is formed by implementing die-cast molding to such metallic material.

Meanwhile, in the case where metallic plate material such as aluminum alloy or titanium alloy, etc. is used to carry out press-working to form a casing, it is impossible to integrally form supporting members for supporting the tape drive unit or the disc recording and/or reproduction unit and the circuit board which are accommodated within the casing, and/or fixing portions for attaching screws for fixing the above-mentioned components. In view of the above, in the case where the casing formed by pressing metallic plate material is used, there is prepared an attachment member formed by molding synthetic resin in a manner separate from the casing to attach the tape drive unit or the disc recording and/or reproduction unit, etc. through the attachment member. In this case, the casing is also fixed to the attachment member.

As stated above, in the case where the casing formed by press-working is used, an attachment member molded by synthetic resin is required. As a result, the number of parts constituting the equipment body is increased. Thus, the configuration becomes complicated.

Moreover, in the case where the casing is formed by die-cast molding zinc alloy or aluminum alloy, it is possible to form the attachment portion for attaching the tape drive unit or the disc recording and/or reproduction unit, etc. in a manner integral with the casing. Accordingly, the necessity of using separate attachment member is eliminated. Therefore, reduction of the number of parts can be realized. However, since weight of the casing becomes heavy (is increased), the weight of the equipment itself would be increased. Namely, since specific gravity of zinc is about 6.6, and even when aluminum which has relatively small specific gravity among metallic materials is used, its specific gravity is 2.7, in the case where metallic alloy of this kind is caused to undergo die-cast molding to integrally form attachment member, etc., the quantity of material used is also increased, resulting in heavy weight of the casing.

Accordingly, in the case where such a casing of large (heavy) weight is applied to electronic equipment used in a carrying (portable) manner, convenience of the portability is adversely affect.

In the case where a speaker unit is caused to be included within a casing as described above, since it is impossible to sufficiently absorb vibration produced when the speaker unit is driven, it becomes difficult to obtain reproduction sound having satisfactory or excellent sound quality. Namely, in the case where the speaker unit is attached through the attachment member to the metallic casing, it is difficult to firmly fix the speaker unit to the casing. Accordingly, in the case where the speaker unit is driven, any unnecessary vibration takes place, resulting in deteriorated sound quality. In electronic equipment in which the attachment member for attaching the speaker unit, etc. is disposed within the casing, since it is difficult to constitute space sufficient to attenuate sound radiated from the back of the speaker unit within the casing, it is difficult to realize satisfactory reproduction characteristics.

In addition, in the case where the casing formed by die-cast molding zinc alloy or aluminum alloy is used, it is possible to directly attach the speaker unit to the casing. However, since vibration of the speaker unit cannot be sufficiently absorbed by the casing, any unnecessary vibration takes place, thus failing to obtain satisfactory reproduction characteristic.

DISCLOSURE OF THE INVENTION

An object of this invention is to provide an electronic equipment such as a recording and/or reproducing apparatus for a recording medium, etc. which realizes light weight of the equipment itself, and which can guarantee sufficient mechanical strength.

Another object of this invention is to provide an electronic equipment such as a recording and/or reproducing apparatus, etc. which attenuates vibration transmitted to the tape drive unit or the disc recording and/or reproduction unit for carrying out recording and/or reproduction of information signals accommodated within the casing, thus making it possible to realize stable recording and/or reproduction of information signals.

A further object of this invention is to provide electronic equipment such as a recording and/or reproducing apparatus, etc. adapted so that a vibration source like a speaker unit is included therewithin, the electronic equipment being permitted to prevent vibration from the vibration source from being transmitted to the tape drive unit or the disc recording and/or reproduction unit, thus to realize stable recording and/or reproduction of information signals.

A still further object of this invention is to provide an electronic equipment which can realize improvement in the reproduction characteristic of the speaker unit included within the casing.

A still more further object of this invention is to provide an electronic equipment such as a recording and/or reproducing apparatus, etc. which can realize improvement in the sound collection characteristic of the microphone unit included within the casing.

A further different object of this invention is to provide an electronic equipment which can realize reliable protection of the electronic circuit included within the casing.

A recording and/or reproducing apparatus for a recording medium as electronic equipment according to this invention proposed in order to attain objects as described above comprises: a recording and/or reproduction unit for carrying out recording and/or reproduction of the recording medium; and a casing for accommodating the recording and/or reproduction unit therewithin, wherein at least a portion of the casing is formed by magnesium or magnesium alloy, or by die-cast molding magnesium or magnesium alloy.

Moreover, an electronic equipment according to this invention comprises: an electronic circuit; an electro-acoustic transducer like a speaker unit for transforming a signal outputted from the electronic circuit into audible sound; and a casing to which the electro-acoustic transducer is attached, wherein at least a portion of the casing is formed by magnesium or magnesium alloy, or by die-cast molding magnesium or magnesium alloy.

Further, a recording and/or reproducing apparatus for a recording medium according to this invention comprises: a micrphone unit; a recording and/or reproduction unit supplied with an output signal from at least the microphone unit and adapted for carrying out recording and/or reproduction of the recording medium; and a casing adapted so that the recording and/or reproduction unit is accommodated therewithin and the microphone unit is attached thereto, wherein a portion where at least the microphone unit is attached of the casing is formed by magnesium or magnesium alloy, or by die-cast molding magnesium or magnesium alloy.

Furthermore, a recording and/or reproducing apparatus for a recording medium according to this invention comprises: a recording and/or reproduction unit for carrying out recording and/or reproduction of the recording medium; a speaker unit supplied with an output signal from the recording and/or reproduction unit; and a casing adapted so that the recording and/or reproduction unit is accommodated therewithin and the speaker unit is attached thereto, wherein a portion where at least the speaker unit is attached of the casing is formed by magnesium or magnesium alloy, or by die-cast molding magnesium or magnesium alloy.

In addition, an electronic equipment according to this invention comprises: an electronic circuit; a circuit board on which the electronic circuit is provided; and a casing adapted so that at least the circuit board is accommodated therewithin and an operation unit for allowing user to carry out an ON/OFF operation of at least a power supply of the electronic equipment is provided, wherein at least a portion of the casing is formed by magnesium or magnesium alloy, or by die-cast molding magnesium or magnesium alloy. In this case, the circuit board is attached to the casing by using tapping screws.

Still further objects of this invention and advantages obtained by this invention will become more clear from the description of the embodiment which will be explained below with reference to the attached drawings.

BEST MODE FOR CARRYING OUT THE INVENTION

Electronic equipment according to this invention will now be described in detail with reference to the attached drawings.

The embodiment described below will be explained by taking the example of a disc recording and/or reproducing apparatus as electronic equipment. This disc recording and/or reproducing apparatus uses, as a recording medium, a disc cartridge adapted so that an optical disc or a magneto-optical disc which is a disc shaped recording medium on which information signals are recorded is accommodated within a cartridge body which takes rectangular shape.

Figure 1:
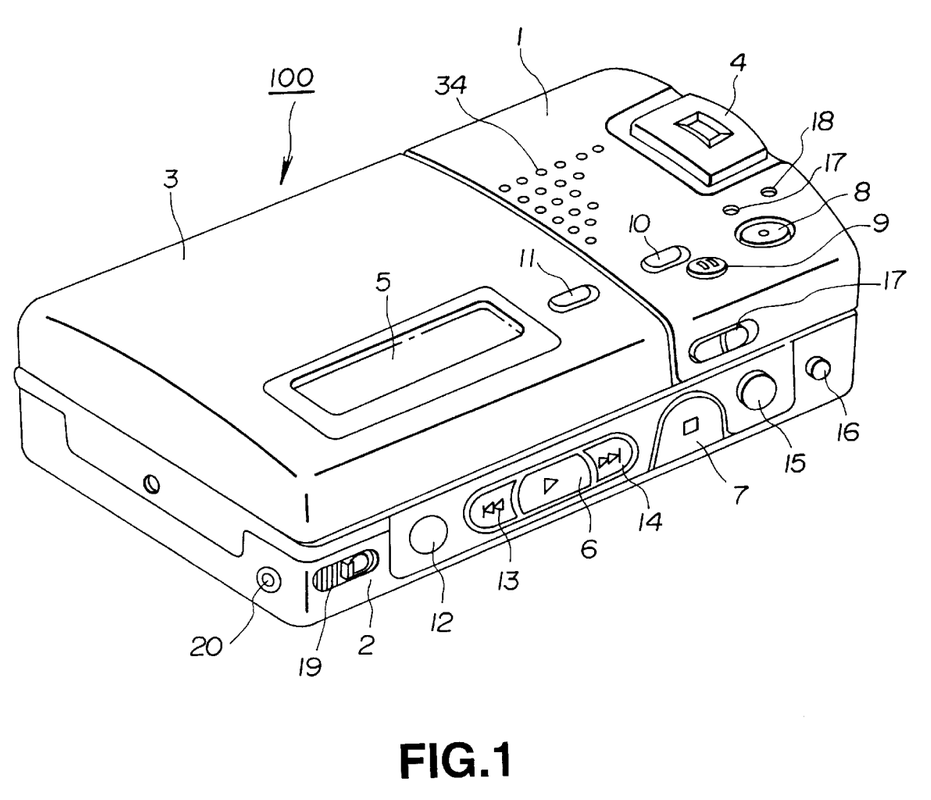
FIG. 1 is a perspective view showing a disc recording and/or reproducing apparatus which is electronic equipment according to this invention.
Figure 2:
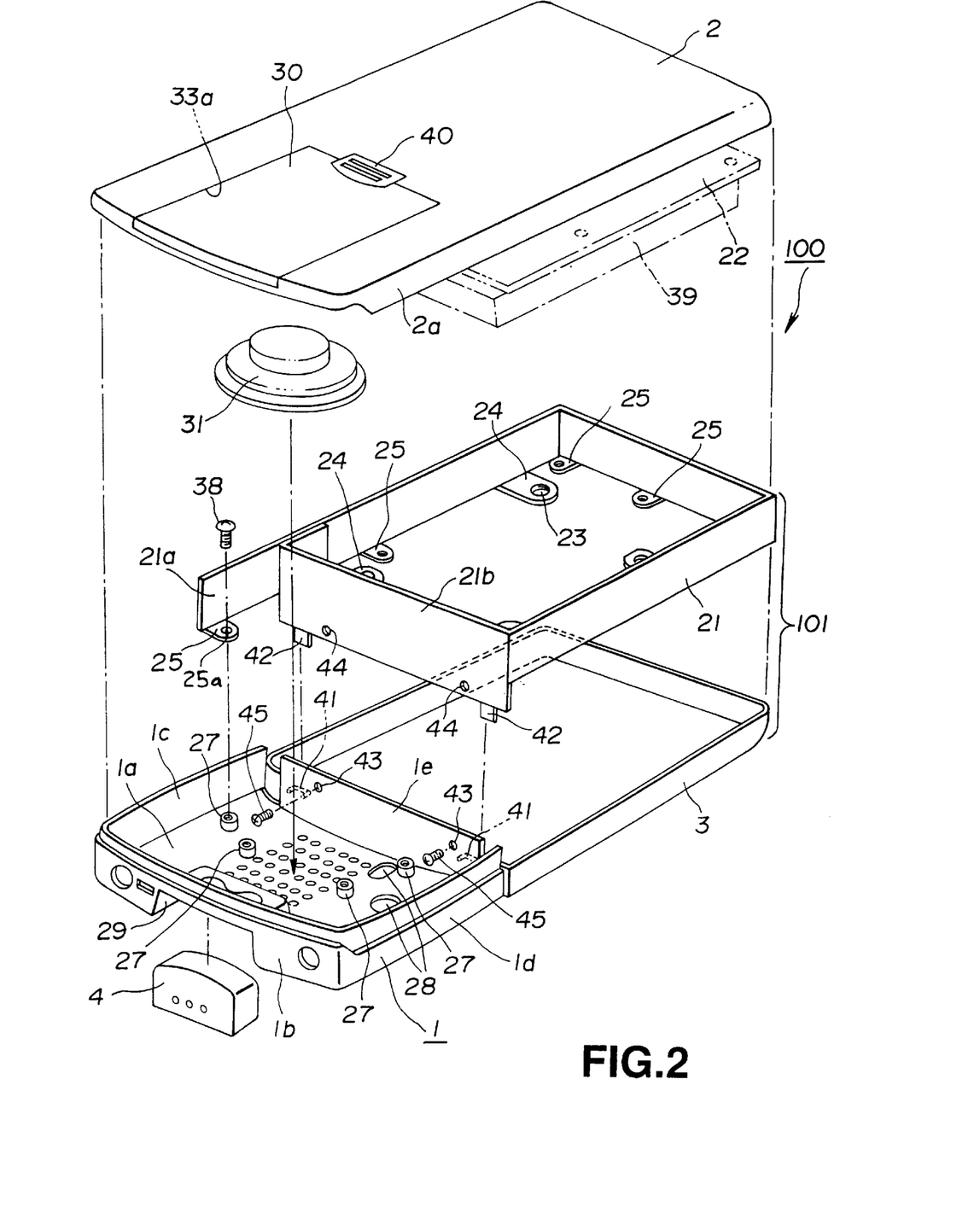
FIG. 2 is an exploded perspective view showing a casing constituting the apparatus.

The disc recording and/or reproducing apparatus to which this invention is applied comprises, as shown in FIGS. 1 and 2, a casing 100, wherein, within the casing 100, a recording/reproduction unit 39 for carrying out recording/reproduction of information signals with respect to, e.g., a magneto-optical disc accommodated within the disc cartridge loaded into this apparatus, a first printed circuit board 22 on which there is provided an electronic circuit for controlling the operation of the recording and/or reproduction unit 39 and for carrying out processing of information signals which are caused to undergo recording and/or reproduction by the recording and/or reproduction unit 39, a speaker unit 31, a microphone unit 4, and the like are included.

On the external surface of the casing 100, plural operation buttons for selecting operation mode of the recording/reproduction unit 39, an operation button for switching an ON/OFF operation of the power supply, and a display unit 5 for displaying operation state, etc. are disposed as described later.

Meanwhile, the recording/reproduction unit 39 accommodated within the casing 100 comprises a disc rotational operation mechanism for rotationally operating a magneto-optical disc or an optical disc accommodated within the disc cartridge loaded in this apparatus, and an optical pick-up unit and a magnetic head unit constituting recording/reproducing means for carrying out recording/reproduction of information signals with respect to the magneto-optical disc or the optical disc rotationally operated by the disc rotational operation mechanism.

The disc rotational operation mechanism constituting the recording/reproduction unit 39 is composed of a disc table and a spindle motor for rotationally operating the disc table. The magneto-optical disc or the optical disc accommodated within the disc cartridge loaded in this apparatus is mounted on the disc table, and is attracted by magnet provided on the disc table so that it is clamped. Thus, when the spindle motor is rotationally driven, the magneto-optical disc or the optical disc is rotationally operated in one body with the disc table.

Moreover, the optical pick-up unit is caused to undergo movement operation extending over inner and outer circumferences of the magneto-optical disc or the optical disc rotationally operated by the disc rotational operation mechanism. Thus, the optical pick-up unit scans recording tracks of the magneto-optical disc or the optical disc extending over inner and outer circumferences thereof by light beams emitted from a light source-like semiconductor laser and converged by an object lens (objective) to thereby read out information signals recorded on the magneto-optical disc or the optical disc. Namely, the optical pick-up unit irradiates light beams onto the magneto-optical disc or the optical disc to detect return light from the magneto-optical disc or the optical disc by means of a photo-detector (light detecting element) to thereby carry out read-out operation of information signals recorded on the magneto-optical disc or the optical disc. In addition, the optical pick-up unit and the magnetic head unit apply an external magnetic field modulated in accordance with an information signal to be recorded from the magnetic head while irradiating light beams emitted from the optical pick-up unit onto the magneto-optical disc to thereby carry out recording of the desired information singal.

Namely, the recording/reproduction unit 39 carries out, by using the optical pick-up unit and/or the magnetic head unit, recording and/or reproduction of information signals with respect to the magneto-optical disc or the optical disc rotationally operated after loaded into the disc rotational operational mechanism.

The casing 100 within which the recording/reproduction unit 39 constituted as described above is accommodated is composed of a chassis 1 constituting a first portion, a frame 21 constituting a second portion attached in parallel to one end side of the chassis 1, a cover portion 3 rotatably attached on the frame 21, and a bottom portion 2 attached to the chassis 1 and the frame 21.

The chassis 1 constituting the casing 100 is integrally formed by magnesium or magnesium alloy. In more practical sense, the chassis 1 is formed by die-cast molding magnesium or magnesium alloy. As magnesium alloy used here, AZ91D or AZ91B of the ANSI (American National Standards Institute) may be used.

Meanwhile, the chassis 1 constitutes a portion of the casing 100, and includes, as shown in FIG. 2, a top plate 1a such that the top plate 1a takes substantially rectangular shape and the central portion thereof is swollen and formed so that it is curved toward the outward, wherein a front side wall 1b is formed in a rising manner (hereinafter simply referred to as rising-formed depending upon circumstances) at the front end side of the top plate 1a, and side walls ic, id are integrally formed in a manner continuous to the front side wall 1b at both sides opposite to each other perpendicular to the front end of the top plate 1a. In addition, a connecting piece le for connecting the frame 21 is integrally rising-formed at the back side opposite to the front side wall 1b.

Figure 3:
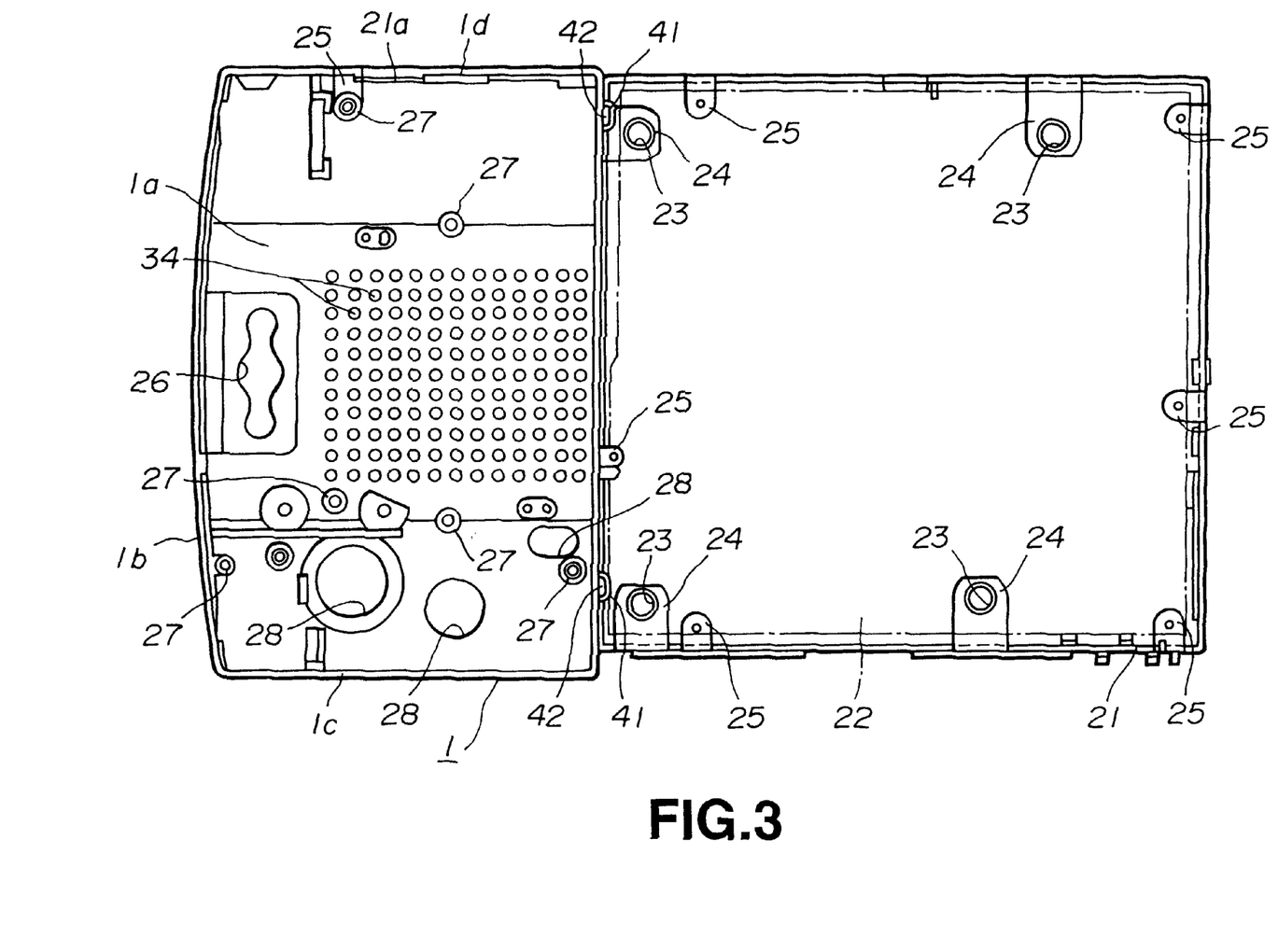
FIG. 3 is a plan view showing chassis and frame portion constituting the casing.

Further, substantially at the central portion of the top plate 1a of the chassis 1, there are bored, as shown in FIG. 3, sound producing holes 34 comprised of a large number of small holes for radiating sound reproduced from the speaker unit 31 attached within the chassis 1 toward the outward of the casing 100. Moreover, at the position of the side of one side wall 1c of the top plate 1a, there are bored plural penetration holes 28 for projecting various operation buttons toward the outward of the casing 100. Further, at the position along the front side wall 1b side of the top plate 1a, there is provided a penetration hole 26 for allowing the external connecting code drawn out from the microphone unit 4 attached at the chassis 1 to be inserted therethrough. At the position where the penetration hole 26 is provided, an attachment recessed portion 29 for attachment of the microphone unit 4 is formed. This attachment recessed portion 29 is formed in the state where the portion extending from the top plate 1a side to the front side wall 1b of the chassis 1 is opened.

Further, at the internal surface side of the top plate 1a, plural cylindrical bosses 27 to which screws for fixing the speaker unit 31, etc. on the chassis 1 are screw-connected are provided in a projected manner (hereinafter simply referred to as projected depending upon circumstances). Namely, hollow portions formed at the central portions of the respective bosses 27 are caused to serve as the screw-connecting portion of screw. These bosses 27 are formed integrally with the chassis 1 in die-cast molding the chassis 1.

Meanwhile, as the screws adapted to be screw-connected to the bosses 27, tapping screws may be used. This is because magnesium or magnesium alloy constituting the chassis 1 has a small hardness coefficient and formation of a screw thread can be easily made by screw-connection of tapping screws formed by steel. As the result of the fact that tapping screws are used as stated above, attachment work of respective members such as speaker unit 31, etc. becomes extremely easy.

It is to be noted that, at the hollow portion of the boss 27, female screw portion for connection of a screw may be machined by machining after the chassis 1 is caused to undergo die-cast molding.

The frame 21 connected to the chassis 1 formed as described above is formed as shown in FIG. 2 in the state where metallic plate such as aluminum alloy, etc. in a thin plate form is bent so that bent portions are connected substantially in rectangular form. At this frame 21, there are provided, at the lower side edge side, plural screw (screwing) pieces 25 and plural attachment pieces 24 to which the recording/reproduction unit 39 is attached in such a manner bent toward the internal side. Moreover, at one side of the frame 21, an extension piece 21a inserted into the chassis 1 is projected. Also at the lower side edge of the extension piece 21a, screw piece 25 is provided. Further, at the lower side edge of a side 21b of the side where the extension piece 21a is projected of the frame 21, engagement pieces 42, 42 relatively engaged with a pair of engagement portions 41, 41 provided at the outside surface side of the connecting piece 1e of the chassis 1 are projected.

The frame 21 is connected to the chassis 1 in the state where the extension piece 21a is faced to the inside of the chassis 1 in a manner caused to be along the inside surface side of the other side wall 1d and the respective engagement pieces 42, 42 are engaged with the engagement portions 41, 41. At this time, the screw piece 25 provided at the extension piece 21a extended toward the inside of the chassis 1 is caused to correspond to one boss 27 of the chassis 1 side. Further, the extension piece 21a is fixed to the chassis 1 by screw-connecting screw 38 inserted into a penetration hole 25a bored at the screw piece 25 to the boss 27. In addition, respective pairs of screw holes 43, 43 and 44, 44 are bored between the connecting piece 1e of the chassis 1 and the side 21b opposite to the connecting piece 1e. Further, fixing (set) screws 45, 45 are screw-connected between these screw holes 43, 43 and 44, 44, whereby the connecting piece 1e of the chassis 1 and the frame 21 are fixedly connected.

As stated above, by engaging the engagement pieces 42, 42 with the chassis 1 side to fix the extension piece 21a and the side 21b opposite to the connecting piece 1e of the chassis 1 by means of screws 38, 45, the frame 21 is integrally attached to the chassis 1.

Moreover, the cover portion 3 constituting the casing 100 is rotatably attached in the state where the base end portion side thereof is supported by the frame 21 in such a manner to close one opening portion side of the frame 21. Namely, when the cover portion 3 is rotationally operated with the pivotal portion of the base end portion side supported by the frame 21 being as center, the cover portion 3 opens and closes one opening portion side of the frame 21.

It is to be noted that, although not shown a cartridge holder for holding the disc cartridge loaded into the recording/reproduction unit 39 is attached at the cover portion 3 so that it can be rotated in a synchronous manner. When the cover portion 3 is rotationally operated, the cartridge holder carries out loading/unloading of the disc cartridge inserted and held therein with respect to the recording/reproduction unit 39.

The bottom portion 2 constituting the casing 100 is formed substantially rectangular in the state where a rising peripheral wall 2a is formed at the peripheral edge thereof. Further, the bottom portion 2 is attached to a connecting body 101 by screws in a manner to close the opening portion side of the connecting body 101 of the chassis 1 and the frame 21. At the portion opposite to the chassis 1 of the bottom portion 2, a battery loading/unloading hole 33a for loading/unloading battery with respect to a battery accommodating portion 33 constituted within the casing 100 is provided. This battery loading/unloading hole 33a is opened and closed by an opening/closing cover 30 rotatably attached on the bottom portion 2.

As the power supply for driving the recording/reproducing apparatus of this embodiment, a battery such as a dry battery or secondary battery, etc. is used. Accordingly, a battery such as a dry battery or secondary battery, etc. is selectively accommodated within the battery accommodating portion 33.

Figure 4:
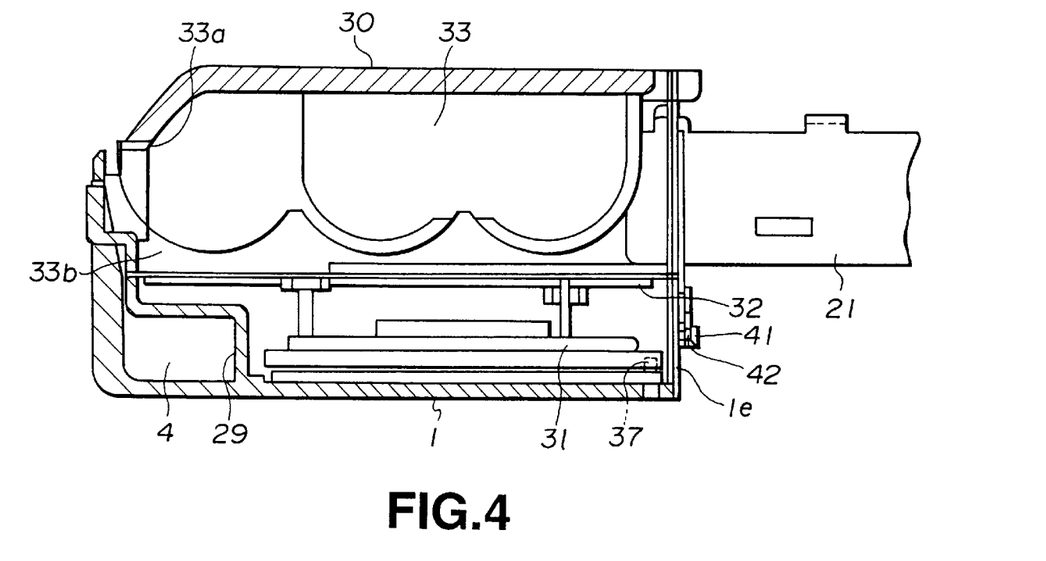
FIG. 4 is a cross sectional view showing the essential part of the casing.

Further, within the chassis 1 constituting the casing 100, as shown in FIG. 4, a second printed circuit board 32 on which an electronic circuit for driving the speaker unit 31 is constituted and a battery accommodating body 33b constituting the battery accommodating unit 33 are disposed. The speaker unit 31 accommodated within the chassis 1 is connected to the electronic circuit of the first printed circuit board 22 through the wiring pattern of the second printed circuit board 32 and the connection wires. Accordingly, the speaker unit 31 is adapted so that an acoustic signal reproduced by the recording/reproduction unit 39 is inputted thereto to convert the acoustic signal into audible sound to output it.

Figure 5:
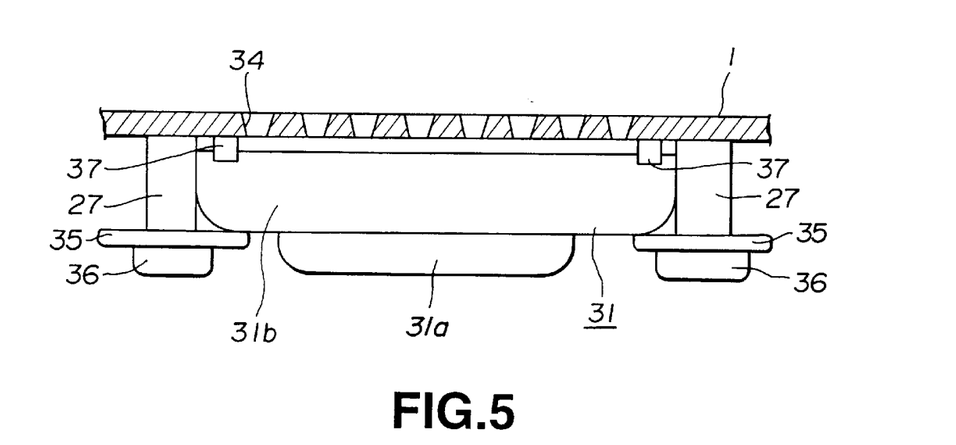
FIG. 5 is a cross sectional view showing the state where speaker unit is attached to the chassis constituting the casing.

Meanwhile, the speaker unit 31 is disposed within the chassis 1 in the state where the sound producing surface side to which the vibrating plate is faced is opposed to the sound producing holes 34 bored at the top plate 1a. Further, the speaker unit 31 is attached to the chassis 1, as shown in FIG. 5, in the state where the peripheral edge of a flange portion 31b of a housing 31a within which speaker element is accommodated is caused to be engaged with positioning pieces 37, 37 projected on the internal surface side of the top plate 1a, and it is supported by set screws 36, 36 which are screw-connected to the bosses 27, 27. The set screws 36, 36 which support the speaker unit 31 are provided, at the base end portion side of the shaft portion thereof, with flange portions 35, and support the speaker unit 31 with respect to the chassis 1 by pressing and supporting the peripheral edge of the housing 31a by the flange portions 35.

Moreover, the second printed circuit board 32 is attached to the chassis 1 through screws which are screw-connected to the bosses 27.

Further, the battery accommodating body 33b constituting the battery accommodating unit 33 is disposed within the chassis 1 in the state where the opening portion side is faced to the battery loading/unloading hole 33a. This battery accommodating body 33b is also fixed on the chassis 1 by screws which are screw-connected to the bosses 27. The battery accommodating body 33b is constituted so that three batteries are loaded (accommodated), and includes plural connection terminals with which electrodes of the batteries loaded therein are in contact. These connection terminals are connected to the electronic circuit constituted on the first printed circuit board 22, and supply of power to the drive unit such as the recording/reproduction unit 39, etc. is carried out through the electronic circuit.

It is to be noted that the disc recording and/or reproducing apparatus of this embodiment not only uses, as the power supply, battery accommodated within the battery accommodating portion 33, but also supplies external power of a predetermined voltage through a jack 20 for connection of external power supply provided at one end surface side of the bottom portion 2 so that it can be driven.

At an attachment recessed portion 29 provided at the chassis 1, the microphone unit 4 is disposed in such a manner that it is fitted thereinto. This microphone unit 4 is attached to the chassis 1 in a manner caused to be through dumper formed by material having elasticity such as rubber, etc. between the microphone unit 4 and the attachment recessed portion 29. Moreover, the microphone unit 4 is connected to the electronic circuit of the first printed circuit board 22 in the state where an external connection cord is caused to be passed through the penetration hole 26 so that it is extended to the inside of the casing 100.

Further, at the chassis 1, a recording button 8, a pause button 9, an end search button 10 and a hold button 17 caused to undergo slide operation, which constitute the operation unit for selecting operation mode of the recording/reproduction unit 39 are disposed. These buttons are adapted so that their front end sides are projected toward the external of the chassis 1 through the penetration hole 28. In this example, selector (changeover) switches for selecting respective operation modes are disposed in correspondence with respective buttons. These selector switches are electrically connected to the electronic circuit constituted on the first printed circuit board 22.

Further, a display unit 5 is disposed at the upper surface side of the cover body 3. This display unit 5 is constituted by using a display element like a Liquid Crystal Display (LCD) element. The display unit 5 is electrically connected to the electronic circuit constituted on the first printed circuit board 22, and is driven in accordance with a control signal delivered from the electronic circuit to carry out display corresponding to the control signal.

Moreover, at one side surface side of the bottom portion 2 constituting the casing 100, a reproduction button 6, a stop button 7, and recording track search buttons 13, 14 which serve to select operation mode of the recording/reproduction unit 39 are disposed, and a cover opening button 19 for carrying out opening operation of the cover body 3 is disposed. These respective buttons are also adapted so that their front end sides are projected toward the external of the casing 100 through through-holes bored at one side surface of the bottom portion 2. The switches caused to undergo a switching operation by the respective buttons which select the operation modes are electrically connected to the electronic circuit of the first printed circuit board 22.

In accordance with the disc recording and/or reproducing apparatus of this embodiment, the electronic circuit constituted on the first printed circuit board 22 is controlled by operating the above-described respective operation buttons. As a result, a control signal corresponding to the operation is outputted from this electronic circuit so that the operation mode of the recording/reproduction unit 39 is selected. Thus, recording and/or reproduction of information signals with respect to the magneto-optical disc or the optical disc is carried out.

Namely, when the recording button 8 is operated so that the recording mode is selected, recording of speech signals collected by the microphone unit 4, or recording of information signals from the external equipment inputted through the external equipment connection terminal is carried out. These speech signals and information signals are recorded by using the optical pick-up unit and the magnetic head with respect to the magneto-optical disc of the recording/reproduction type.

Moreover, when the reproduction button 6 is operated so that the reproduction mode is selected, a read-out operation of acoustic (sound) signals which are information signals recorded on the magneto-optical disc or the optical disc by the optical pick-up unit is carried out. These acoustic signals thus read out are reproduced as audible sound through the speaker unit 31.

Meanwhile, in the disc recording and/or reproducing apparatus of this embodiment, since the chassis 1 constituting the casing 100 is formed by die-cast molding magnesium or magnesium alloy, and bosses to which screws for attachment of members are screw-connected are integrally formed, it is possible to directly attach, to the chassis 1, the speaker unit 31 or the battery accommodating body 33b constituting the battery accommodating unit 33 without use of an attachment member separate from the chassis 1, etc. Accordingly, the configuration of the casing 100 is simplified. Thus, assembling becomes easy.

Moreover, since magnesium which is constituent material of the chassis 1 constituting a portion of the casing 100 has specific gravity of 1.8, light weight of the casing 100 is attained. Thus, light weight of the apparatus itself is realized. When applied to the portable disc recording and/or reproducing apparatus, convenience of portability can be further improved. Further, since die-cast molding of magnesium or magnesium alloy can be carried out with extremely high accuracy, it is possible to form the chassis 1 with high accuracy. Furthermore, since a molded body of magnesium or magnesium alloy has also high mechanical strength, a strong or firm casing 100 can be constituted. Thus, a high reliability disc recording and/or reproducing apparatus can be constituted. In addition, since a molded body of magnesium or magnesium alloy presents the feeling of metal, the appearance of the disc recording and/or reproducing apparatus can become satisfactory.

Further, since the speaker unit 31 is directly attached to the chassis 1, there is no possibility that any unnecessary vibration may take place through medium (intervening member) when the speaker unit 31 is caused to be driven. Thus, reproduction sound of satisfactory sound quality can be obtained. In addition, since the chassis 1 can be caused to be of unitary structure, sealing (air-tight) structure can be easily realized, and space sufficient to attenuate sound radiated toward the back side can be easily constituted at the back side of the speaker unit 31. Accordingly, improvement in the reproduction characteristic can be realized.

Further, the molded body obtained by die-cast molding magnesium has high vibration absorption characteristic (dumping capacity) as compared to cast iron or extensible material of aluminum (JIS (Japanese Industrial Standard) ·356-T6) as indicated by the following Table 1.

TABLE 1

| | DUMPING CHARACTERISTIC (%) | | | |
| --- | --- | --- | --- | --- |
| | 14 MPa | 20 MPa | 25 MPa | 35 MPa |
| MAGNESIUM DIE-CAST (AZ91D) | 13.3 | 24.0 | 32.0 | 52.0 |
| CAST IRON | 5.0 | 12.2 | 14.2 | 16.5 |
| ALUMINUM EXTENSIBLE MATERIAL (356-T6) | 0.48 | 0.62 | 0.82 | 1.2 |

This vibration absorption characteristic (dumping capacity) (SDC) indicates energy loss (%) lost at one cycle of vibration when pressure of a predetermined value (MPa) is applied to material to be tested to carry out vibration. Assuming that the initial vibration energy is $A_0$ and the vibration energy after one cycle is $A_1$, the vibration absorption characteristic can be determined by the formula shown below:

$$SDC = 100 \times (A_0^2 - A_1^2)/A_0^2 \qquad (1)$$

Also as is clear from the above-mentioned Table 1, in the vibration absorption characteristic, the molded body obtained by die-cast molding magnesium has the (dumping) characteristic (%) which is about twice to three times greater than that of cast iron, and is about 30 times to 40 times greater than that of extensible material of aluminum (356-T6).

As the result of the fact that magnesium excellent in the vibration absorption characteristic is die-cast molded as described above to form the chassis 1, vibration produced when the speaker unit 31 attached to the chassis 1 is driven and transmitted to the chassis 1 can be securely attenuated by the chassis 1. Thus, it is prevented that any unnecessary vibration is added to reproduction sound. As a result, deterioration of sound quality of reproduction sound radiated from the speaker unit 31 is prevented. Thus, improvement in the reproduction characteristic can be made.

Moreover, since vibration when the speaker unit 31 is driven is attenuated by the chassis 1, transmission to the recording/reproduction unit 39 side attached to the frame 21 is prevented. For this reason, stable rotational operation of the magneto-optical disc or the optical disc is realized. Further, drive control for the object lens (objective) drive unit to allow an object lens (objective) which converges light beams emitted from the optical pick-up unit to irradiate them onto the magneto-optical disc or the optical disc to undergo drive control in the focusing direction which is the optical axis direction thereof and in the tracking direction which is the plane direction perpendicular to the optical axis can be stably carried out without suffering from disturbance. Namely, since stable rotation of the magneto-optical disc or the optical disc is carried out so that precise control of the object lens drive unit can be realized, recording and/or reproduction of information signals can be made with satisfactory recording and/or reproduction characteristic.

Further, since vibration produced from the recording/reproduction unit attached at the frame 21 side is attenuated by the chassis 1, transmission of unnecessary vibration to the microphone unit 4 attached at the chassis 1 side is prevented. For this reason, improvement in sound collection characteristic of the microphone unit 4 is realized. Thus, it becomes possible to carry out recording of external sound having satisfactory sound quality.

Furthermore, since the speaker unit 31 is attached to the chassis 1 side formed by magnesium or magnesium alloy excellent in the vibration absorption characteristic, it is possible to interrupt (prevent) transmission of vibration to the side where the recording/reproduction unit 39 is disposed. For this reason, vibration applied to the first printed circuit board 22 on which there is provided the electronic circuit for controlling the recording/reproduction unit 39, etc. attached to the side where the recording/reproduction unit 39 is disposed is suppressed. Thus, not only protection of the printed circuit board 22 can be made, but also stable operation of the electronic circuit can be realized.

In addition, the second printed circuit board 32 attached to the chassis 1 using magnesium or magnesium alloy having conductive property is directly attached to the chassis 1, and is grounded through the chassis 1. As a result, the configuration for grounding can be simplified. Thus, assembling becomes easy.

While only the portion of the chassis 1 to which the speaker unit 31 is attached is formed by magnesium or magnesium alloy in the above-described embodiment, the bottom portion 2 and/or the cover portion 3 constituting the casing 100, and the entirety of the casing 100 may be formed by magnesium or magnesium alloy. When the entirety of the casing 100 is formed by magnesium or magnesium alloy excellent in the vibration absorption characteristic, it is limited that vibration applied from the external of the apparatus is transmitted to the recording/reproduction unit 39, etc. within the casing 100. Thus, stable recording and/or reproduction of information signals can be realized. In addition, the influence of vibration can be eliminated between respective mechanisms or respective members disposed within the casing 100.

Further, while explanation has been given in the above-described embodiment by taking the example where this invention is applied to the disc recording and/or reproducing apparatus, also in the case where this invention is applied to the recording and/or reproducing apparatus such as tape recorder or video tape recorder, etc. using magnetic tape as a recording medium, advantages as described above can be realized. In addition, not only in the case where this invention is applied to the equipment comprising the recording/reproduction unit as indicated in the above-described embodiment, but also in the case where this invention is applied to the equipment comprising the electro-acoustic transducer like speaker unit, the electronic circuit and the printed circuit board on which the electronic circuit is constituted, it is possible to realize advantages as described above. Namely, the electro-acoustic transducer such as speaker unit, etc. is attached to the chassis side formed by magnesium or magnesium alloy excellent in the vibration absorption characteristic, whereby vibration produced from the electro-acoustic transducer is prevented from being transmitted to the printed circuit board side. Thus, stable sound reproduction can be realized.

Industrial Applicability

Since the electronic equipment according to this invention is adapted so that at least a portion of the casing for accommodating the recording/reproduction unit, the electro-acoustic transducer such as speaker unit, etc., and/or the electronic circuit is formed by magnesium or magnesium alloy excellent in the vibration absorption characteristic, vibration produced from respective portions or respective members is attenuated, thus making it possible to eliminate influence of vibration between respective portions or respective members. Accordingly, in the case where this invention is applied to the recording and/or reproducing apparatus for recording medium, satisfactory recording and/or reproduction of information signals can be realized. Thus, reproduction of sound having more satisfactory sound quality can be realized with satisfactory reproduction characteristic.

In addition, also in the case where this invention is applied to other electronic equipment, reproduction of sound having satisfactory sound quality can be realized with satisfactory reproduction characteristic.

We claim:

1. A recording and/or reproducing apparatus for a recording medium, comprising:

recording and/or reproducing means for carrying out recording and/or reproduction of the recording medium;

a loudspeaker connected to an output of the recording and/or reproducing means;

a casing for accommodating the recording and/or reproducing means within the casing; and vibration damping means unitarily formed with the casing as one piece, the vibration damping means formed by die cast molding an AZ91 magnesium alloy and including integrally die cast molded loudspeaker mounting elements for attaching directly thereto a flange of said loudspeaker, whereby vibrations produced by said loudspeaker are damped by the vibration damping means before the vibrations are transmitted to the casing.

2. The recording and/or reproducing apparatus for a recording medium as set forth in claim 1, wherein said casing further comprises a cover portion to open and close a front side of the recording and/or reproducing means, and a bottom portion to close a back side of the recording and/or reproducing means.

3. An electronic equipment comprising:

an electronic circuit;

a circuit board on which said electronic circuit is provided;

an electro-acoustic transducer for transforming a signal output from said electronic circuit into audible sound;

a casing; and vibration damping means unitarily formed with the casing as a single piece, the vibration damping means formed by die cast molding an AZ91 magnesium alloy and including integrally die cast molded electro-acoustic transducer mounting elements for attaching directly thereto a flange of said electro-acoustic transducer, whereby vibrations produced by said electro-acoustic transducer are damped by the vibration damping means before the vibrations are transmitted to the casing.

4. The electronic equipment as set forth in claim 3, wherein said circuit board is attached to said casing by means of tapping screws.

5. The electronic equipment as set forth in claim 3, further comprising another circuit board, and wherein the casing includes a second portion within which said other circuit board is accommodated.

6. A recording and/or reproducing apparatus for a recording medium, comprising:

a microphone unit;

a loudspeaker;

recording and/or reproducing means connected to said loudspeaker and supplied with an output signal from said microphone unit for carrying out recording and/or reproduction of the recording medium; and a casing wherein said recording and/or reproducing means is accommodated and vibration damping means unitarily formed with the casing as one piece, the vibration damping means formed by die cast molding an AZ91 magnesium alloy and including integrally die cast molded loudspeaker mounting elements for attaching directly thereto a flange of said loudspeaker and having said microphone unit directly attached thereto, whereby vibrations produced by said loudspeaker are damped by the vibration damping means before the vibrations are transmitted to said microphone unit and to the casing.

7. The recording and/or reproducing apparatus for a recording medium as set forth in claim 6, wherein the casing includes a partition wall portion which partitions an inside of the casing into a first portion and a second portion integrally formed with said first portion.

8. The recording and/or reproducing apparatus for a recording medium as set forth in claim 6, further comprising:

an electronic circuit;

a circuit board on which said electronic circuit is provided, wherein said circuit board is attached to the casing by means of tapping screws.

9. An electronic equipment comprising:

an electronic circuit;

a circuit board on which said electronic circuit is provided;

a loudspeaker connected to said circuit board;

a power supply;

an operation unit; and a casing wherein said circuit board and said operation unit are accommodated, and wherein said operation unit allows a user to carry out an ON/OFF operation of said power supply of the electronic equipment; and vibration damping means unitarily formed with the casing as a single unit, the vibration damping means formed by die cast molding an AZ91 magnesium alloy and including integrally die cast molded loudspeaker mounting elements for attaching directly thereto a flange of said loudspeaker, whereby vibrations produced by said loudspeaker are damped by the vibration damping means before the vibrations are transmitted to the casing.

* * * * *